United States Patent
Callaghan et al.

(10) Patent No.: US 9,405,925 B2
(45) Date of Patent: Aug. 2, 2016

(54) CONTENT ITEM ENCRYPTION ON MOBILE DEVICES

(71) Applicant: Microsoft Corporation, Redmond, WA (US)

(72) Inventors: David Callaghan, Redmond, WA (US); Ravisankar Pudipeddi, Bellevue, WA (US); Geir Olsen, Kirkland, WA (US); Sachin Patel, Bellevue, WA (US); JianMing Zhou, Sammamish, WA (US); Dylan D'Silva, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 15 days.

(21) Appl. No.: 14/176,143

(22) Filed: Feb. 9, 2014

(65) Prior Publication Data

US 2015/0227753 A1    Aug. 13, 2015

(51) Int. Cl.
*H04L 29/06* (2006.01)
*G06F 21/62* (2013.01)
*G06F 21/10* (2013.01)
*H04L 9/08* (2006.01)

(52) U.S. Cl.
CPC .......... *G06F 21/6218* (2013.01); *G06F 21/10* (2013.01); *G06F 2221/0704* (2013.01)

(58) Field of Classification Search
CPC .................................................. G06F 21/6218
USPC ........................... 713/165, 166, 167; 380/277
See application file for complete search history.

(56) References Cited

U.S. PATENT DOCUMENTS

| | | | | |
|---|---|---|---|---|
| 6,826,690 B1 * | 11/2004 | Hind | ....................... | G06F 21/31 713/173 |
| 6,980,660 B1 * | 12/2005 | Hind | ................... | H04L 63/0823 380/277 |
| 7,350,081 B1 | 3/2008 | Best | | |

(Continued)

FOREIGN PATENT DOCUMENTS

| | | |
|---|---|---|
| EP | 1821230 A1 | 8/2007 |
| WO | 2013048418 A1 | 4/2013 |

OTHER PUBLICATIONS

App Install Location, Published on Jun. 25, 2012, Available at: http://developer.android.com/guide/topics/data/install-location.html.

(Continued)

*Primary Examiner* — Abu Sholeman
(74) *Attorney, Agent, or Firm* — Judy Yee; Micky Minhas

(57) ABSTRACT

Applications are stored on removable storage of a mobile device in an encrypted form to provide isolation and piracy protection. In one implementation, each application is encrypted using its own associated encryption key that is generated based on an identifier of the application and a master key that is associated with a trusted platform module of the mobile device. In another implementation, each application is encrypted using two associated encryption keys. One key is used to encrypt binary data associated with the application such as source code, and the other key is used to encrypt application data such as graphics and configuration files. The encryption keys are each generated using the identifier of the application, the master key, and identifiers of the folders where the corresponding data types are stored on the mobile device. The removable storage includes SD cards formatted using the FAT or exFAT file systems.

18 Claims, 8 Drawing Sheets

(56) References Cited

U.S. PATENT DOCUMENTS

| | | | |
|---|---|---|---|
| 7,930,537 B2 | 4/2011 | Paatero | |
| 7,957,532 B2* | 6/2011 | Chen | H04L 9/0822 380/270 |
| 8,307,458 B2* | 11/2012 | Kasahara | H04L 9/0822 380/201 |
| 8,443,207 B2 | 5/2013 | Yan et al. | |
| 8,484,464 B2 | 7/2013 | Brown et al. | |
| 9,071,580 B2* | 6/2015 | Pigeon | H04L 63/0435 |
| 2003/0084056 A1* | 5/2003 | DeAnna | G06F 9/465 |
| 2003/0115240 A1* | 6/2003 | Cho | G06Q 10/109 718/102 |
| 2003/0236821 A1* | 12/2003 | Jiau | H04L 63/10 709/203 |
| 2006/0069922 A1* | 3/2006 | Jelinek | H04L 63/0823 713/186 |
| 2006/0117013 A1 | 6/2006 | Wada | |
| 2006/0236111 A1* | 10/2006 | Bodensjo | G06F 12/1466 713/176 |
| 2007/0143398 A1* | 6/2007 | Graham | G06Q 40/02 709/204 |
| 2007/0297610 A1* | 12/2007 | Chen | H04L 9/0822 380/270 |
| 2008/0134347 A1* | 6/2008 | Goyal | G06F 21/6209 726/29 |
| 2008/0232598 A1* | 9/2008 | Vennelakanti | G06F 21/62 380/279 |
| 2009/0240953 A1 | 9/2009 | Paul | |
| 2009/0249011 A1* | 10/2009 | Ohishi | G06F 11/1456 711/162 |
| 2010/0190481 A1* | 7/2010 | Nath | H04W 4/20 455/414.3 |
| 2011/0185397 A1* | 7/2011 | Escott | H04B 7/155 726/3 |
| 2012/0150742 A1* | 6/2012 | Poon | G06Q 20/20 705/44 |
| 2012/0150750 A1* | 6/2012 | Law | G06Q 20/20 705/76 |
| 2013/0198522 A1* | 8/2013 | Kohno | G06F 21/62 713/182 |
| 2013/0262862 A1 | 10/2013 | Hartley | |
| 2014/0059341 A1* | 2/2014 | Edwards | G06F 21/6209 713/152 |
| 2014/0364056 A1* | 12/2014 | Belk | H04B 5/0031 455/41.1 |
| 2015/0014342 A1* | 1/2015 | Meindl | B01F 13/0818 221/1 |
| 2015/0026456 A1* | 1/2015 | Kim | G06F 21/00 713/153 |

OTHER PUBLICATIONS

Elenkov, Nikolay, "Using App Encryption in Jelly Bean", Published on Jul. 6, 2012, Available at: http://nelenkov.blogspot.in/2012/07/using-app-encryption-in-jelly-bean.html.

"International Search Report and Written Opinion Issued in PCT Patent Application No. PCT/US2015/014342", Mailed Date: Jul. 22, 2015, 15 Pages.

"Technical Documentation: Samsung Developers", Published on: Sep. 9, 2011, Available at: http://developer.samsung.com/technical-doc/view.do;jsessionid=XGvcVbsWINqpIvxhGn2g6r1GTsWybT12K0pRrSpjXGXnzW2FXTvS!947968688?v=T000000066.

Elenkov, Nikolay, "Jelly Bean Hardware-backed Credential Storage", Published on: Jul. 12, 2012, Available at: http://nelenkov.blogspot.de/2012/07/jelly-bean-hardware-backed-credential.html.

"Second Wriiten Opinion issued in PCT Application No. PCT/US2015/014342", Mailed Date Dec. 11, 2015, 7 Pages.

"International Preliminary Report on Patentability Issued in PCT Application No. PCT/US2015/014342", Mailed Date: Mar. 10, 2016, 10 Pages.

\* cited by examiner

CONTENT ITEM ENCRYPTION ON MOBILE DEVICES

BACKGROUND

Mobile devices such as phones and tablets are becoming the computing device of choice for users. Typically, these mobile devices store a variety of content items such as music, movies, and applications. Users are able to purchase and download content items directly to their mobile devices from online stores or marketplaces. As a result, mobile devices increasingly need a larger and larger amount of storage to accommodate the vast amounts of content items that are available.

As a solution to the increasing storage needs of mobile devices, some manufacturers of mobile device have included removable storage capabilities into their mobile devices. These removable storage capabilities include the ability to read and write from secure digital cards. However, for creators of content items, allowing users to store their content items on removable storage creates several drawbacks.

One such drawback is the ability to share the content items with other users. Because secure digital cards are removable from the mobile devices, and are readable by most personal computers, a user may download a content item such as an application, and may share the application with their friends by copying the contents of the secure digital card on their personal computer. In another example, a user may make some trivial changes to the source code of the application, and may attempt to sell or distribute the modified application as their own creation. Such sales or distribution may violate the intellectual property rights of the creators of the content items.

Another drawback of removable storage is application isolation. Typically, mobile devices execute applications in isolation from one another, using functionality provided by the file system used by the mobile device on the non-removable or internal storage of the mobile device. Secure digital cards often use file systems such as file allocation table ("FAT") and extended file allocation table ("exFAT") file systems which currently lack the isolation functionality of the file systems used by the mobile devices. As a result, a malicious user may use an application stored on the removable storage to interfere with the operation of another application, or content item, stored on the removable storage.

SUMMARY

Applications are stored on removable storage of a mobile device in an encrypted form. In one implementation, each application is encrypted using its own associated encryption key that is generated based on an identifier of the application and a master key that is associated with a trusted platform module of the mobile device. In another implementation, each application is encrypted using two associated encryption keys. One key is used to encrypt binary data associated with the application such as source code, and the other key is used to encrypt application data such as graphics and configuration files. The encryption keys are each generated using the identifier of the application, the master key, and identifiers of the folders where the corresponding data types are stored on the mobile device. The removable storage includes secure digital cards formatted using the FAT or exFAT file systems.

In an implementation, a request to read data associated with a content item is received by a mobile device. The data is encrypted and stored in removable storage associated with the mobile device. It is determined, by the mobile device, that the request to read the data is authorized. In response to determining that request to read the data is authorized, a key associated with the content item is determined by the mobile device. The data associated with the content item is decrypted by the mobile device using the key. The decrypted data is provided by the mobile device.

In an implementation, a request to write data to a region of removable storage is received by a mobile device. The region of removable storage is associated with a content item. It is determined, by the mobile device, that the request to write the data is authorized. In response to determining that request to write the data is authorized, a key associated with the content item is determined by the mobile device. The data is encrypted by the mobile device using the key. The encrypted data is stored in the region of removable storage associated with the content item by the mobile device.

In an implementation, a request to install an application in a removable storage is received at a mobile device. In response to the request, a first folder and a second folder associated with the application are created in the removable storage by the mobile device. A first key is generated using a master key, an identifier of the application, and an identifier of the first folder by the mobile device. A second key is generated using the master key, the identifier of the application, and an identifier of the second folder. A first portion of data associated with the application is encrypted using the first key. A second portion of data associated with the application is encrypted using the second key. The encrypted first portion is stored in the first folder. The encrypted second portion is stored in the second folder. Using different keys for each folder may prevent an application from being able to read files copied from one folder to the other by external computing devices.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
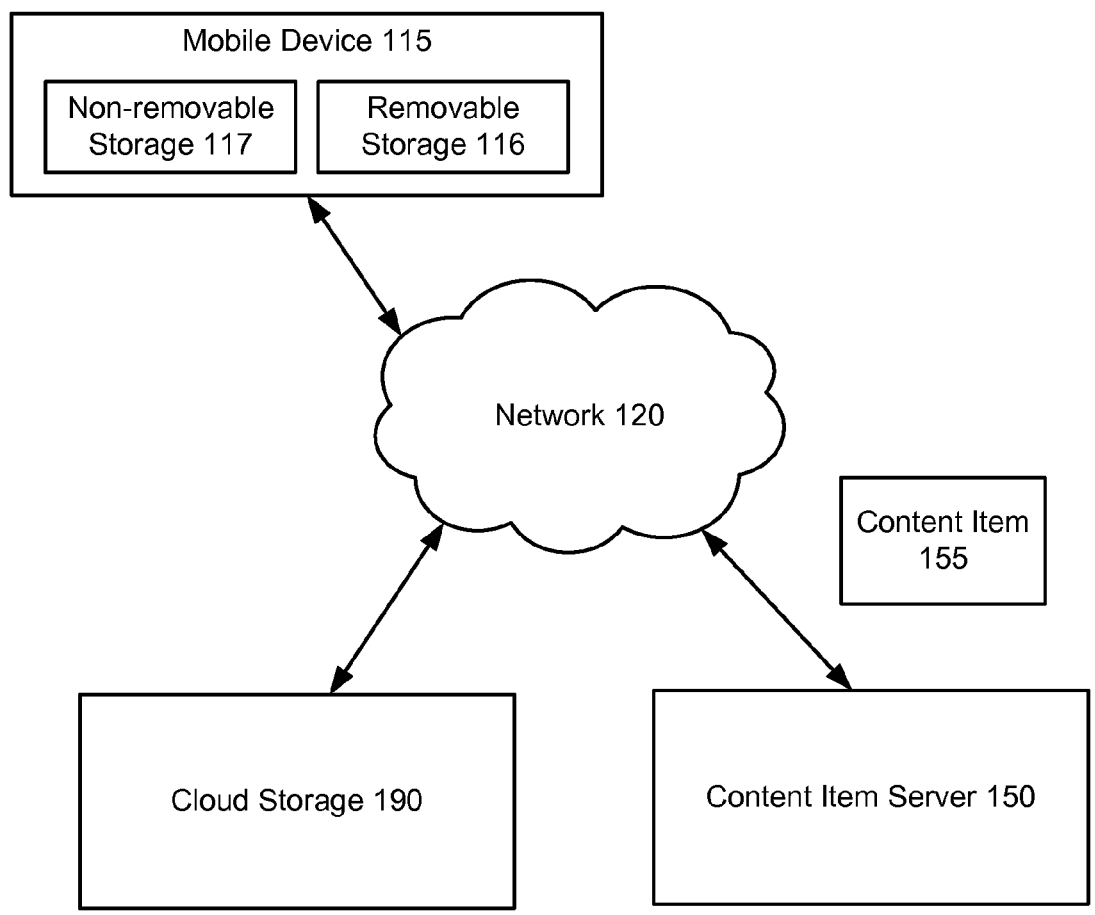
FIG. 1 is an illustration of an example environment for storing content items on mobile devices.

FIG. 1 is an illustration of an example environment 100 for storing content items on mobile devices. As illustrated, the environment 100 includes a mobile device 115 and a content item server 150 in communication with each other through a network 120. The environment 100 may further include cloud storage 160 for securely and reliably backing up and restoring content from the mobile device 115. The network 120 may be a variety of network types including the public switched telephone network (PSTN), a cellular telephone network, and a packet switched network (e.g., the Internet or a cloud network). The mobile device 115 and the content item server 150 may be implemented using one or more general purpose computing devices such as the computing device 800 described with respect to FIG. 8, for example. Moreover, while one mobile device 115 and one content item server 150 are shown in FIG. 1, it is for illustrative purposes only; there is no limit to the number of mobile devices and/or content item servers that may be supported.

A user may use the mobile device 115 to select and download one or more content items 155 from the content item server 150. The content items 155 may include a variety of media files including, but not limited to, video files, music files, and image files. In addition, the content items 155 may comprise applications. The content item server 150 may comprise an online marketplace or webpage through which users may select content items 155 to download. The mobile device 115 may be a computing device such as a cellular phone, tablet computer, or any other type of computing device.

As illustrated, the mobile device 115 may include both removable storage 116 and non-removable storage 117. The non-removable storage 117 may be storage that is internal to the mobile device 115, and/or storage that cannot be easily removed from the mobile device 115. For example, storage may be considered non-removable if it cannot be removed without damaging the mobile device 115, disassembling or partially disassembling the mobile device 115, or without the use of tools such as a screwdriver. Non-removable storage 117 is typically located completely within a housing of the mobile device 115 and may be directly connected to a circuit board or processor using a connection means that is not easily disconnected by a user. Examples of non-removable storage 117 include flash memory. Other types of storage may be used.

In contrast, removable storage 116 may be storage that can be easily removed or added to the mobile device 115. For example, storage such as a disk or module that can be easily inserted into, and removed from, a corresponding slot or interface of the mobile device 115 without damaging the mobile device 115, without disassembling or partially disassembling the mobile device 115, or without the use of tools, may be considered removable storage 116. Examples of removable storage 116 include secure digital ("SD") cards. Other types of storage may be used.

As described above, users of mobile devices 115 may download content items 155 from the content item server 150. Some content items, such as videos and applications, may take up a large amount of storage space. Because the non-removable storage 117 is non-removable, after a user has exhausted the amount of available space of the non-removable storage 117, the user may not download any additional content items without first deleting some of the content items from the non-removable storage 117. In contrast, with removable storage 116, after a user has exhausted the amount of available space of an SD card, the user can remove the full SD card and insert a new SD card to use for additional content items 155. The content items 155 downloaded to the full SD card can be accessed later by replacing the new SD card with the full SD card.

While removable storage 116 may offer almost unlimited storage space to users, because the removable storage 116 is often readable by personal computers, producers or owners of the content items 155 sold or provided by the content item server 150 may make unauthorized copies of the content items 155 or may redistribute the content items 115 as their own. For example, SD cards often use popular file systems such as file allocation table ("FAT") and extended file allocation table ("exFAT"), making them easily readable by most personal computers.

Accordingly, in some implementations, before storing a downloaded content item 155 on the removable storage 116, the mobile device 115 may first encrypt the content item 115 using a master key that is unique to the mobile device 115. The master key may be stored in the non-removable storage 117. The encrypted content items 155 may then be stored in the removable storage 116. When the user of the mobile device 115 later accesses an encrypted content item 155 of the removable storage 116 using the mobile device 115, the key is retrieved from the non-removable storage 117 and is used to decrypt the encrypted content item 155. In the event that a user of the mobile device 115 attempts to access the encrypted content items 155 stored on the removable storage 116 using their personal computer, they will be unable to decrypt any of the encrypted content items 155 without the master key. Such implementations are described further with respect to FIG. 2, for example.

While encrypting the stored content items 155 using the single key as described above may provide some level of piracy protection, it does not also protect against a scenario where a user uses a malicious application stored on the removable storage to provide access to the encrypted content items. For example, a malicious application stored on the removable storage 116, in order to access its own stored application data, would have access to the master key used to encrypt the content items 155. The malicious application could then potentially decrypt any of the stored content items 155 and provide them to a third-party. In addition, such a solution does not provide isolation between applications because each application may access data associated with any of the applications or content items 155 stored on the removable storage 116 using the common master key.

Accordingly, in some implementations, rather than use a single master key to encrypt all of the content items 155 stored on the removable storage 116, each content item 155 may be encrypted and stored using its own key. The key used to encrypt a content item 155 may be determined by the mobile device 115 using an identifier associated with the content item 155 and the master key.

In such implementations, when the user of the mobile device 115 later accesses an encrypted content item 155 of the removable storage 116 using the mobile device 115, the key corresponding to the encrypted content item 155 is used to decrypt the encrypted content item 155. Depending on the particular implementation, the corresponding key may be stored in the non-removable storage 117, or may not be stored and instead may be determined as needed by the mobile device 115 from the master key and the identifier associated with the particular content item 155. Such implementations are described further with respect to FIG. 3, for example.

While using multiple content item specific keys may provide isolation between applications, it may not provide complete piracy protection for content items 155 such as applications. For example, typically applications are installed using multiple folders, such a binary folder than includes source code data that controls the execution of the application, and a data folder that includes data used by the application during execution such as graphics and configuration files. In such scenarios, a malicious user may move the source code data of an application from the binary folder to overwrite known data files in the data folder on the removable storage 116. The unencrypted source code data may then be accessed using the application from the data folder and made available to other users.

Accordingly, to provide additional protection where the content items 155 are applications, the contents items 155 may be stored with each folder or directory associated with the content item encrypted using its own key. The key used for a folder may be determined by the mobile device 115 using an identifier associated with the content item, an identifier associated with the folder, and the master key. Such implementations are described further with respect to FIG. 4, for example.

Figure 2:
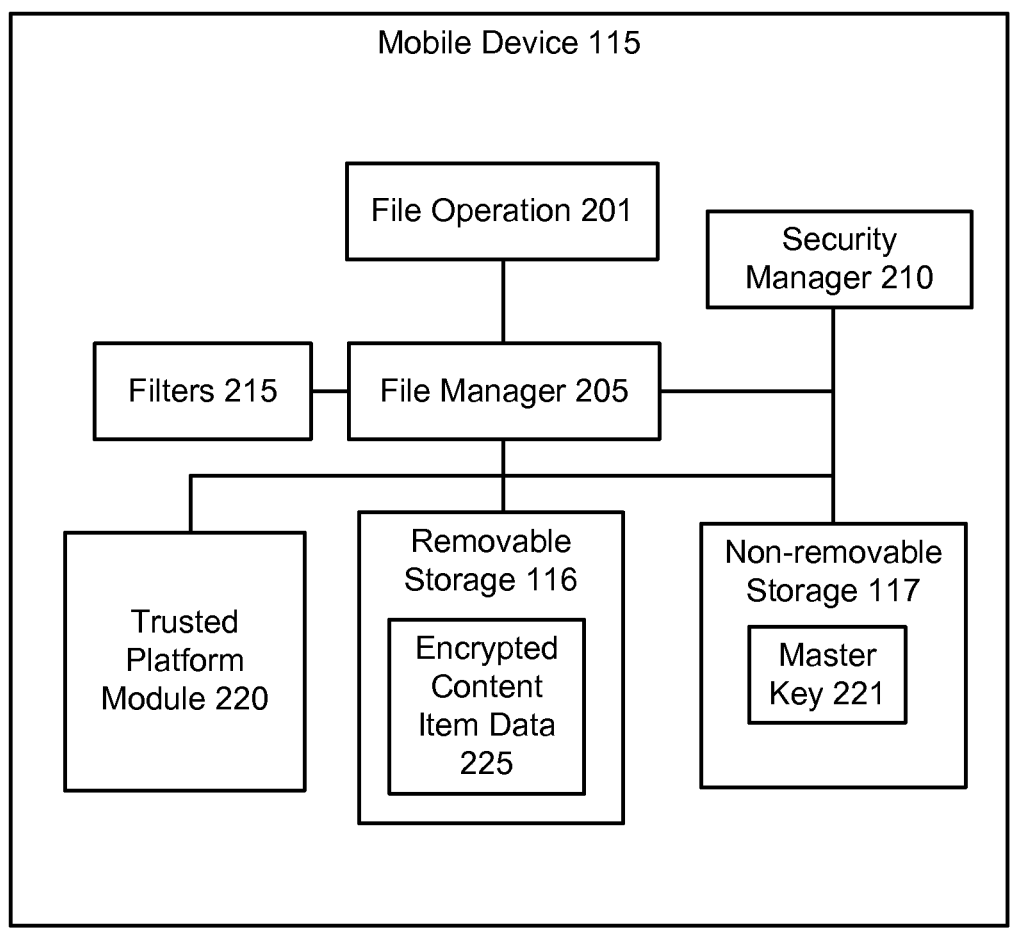
FIG. 2 is an illustration of an implementation of a mobile device.

FIG. 2 is an illustration of an implementation of a mobile device 115. As shown, the mobile device 115 comprises a variety of components including, but not limited to, a file manager 205, a security manager 210, removable storage 116, non-removable storage 117, and a trusted platform module 220. More or fewer components may be supported by the mobile device 115. The mobile device 115 may be a cellular phone, laptop, tablet computer, personal media player, or a portable videogame system. Other types of computers may be used.

In an implementation, the trusted platform module 220 may comprise a known secure co-processor that is found in many computing systems. The trusted platform module 220 may provide one or more cryptographic services to the mobile device 115 including, but not limited to, providing a master key 221. The master key 221 may be unique to the trusted platform module 220 and/or the mobile device 115. The master key 221 may be stored by the trusted platform module 220 in the non-removable storage 117. The location in the non-removable storage 117 used to store the master key 221 may be unavailable to many applications or processes executing on the mobile device 115. Moreover, the location may be difficult for malicious users to locate in the event that the mobile device 115 is disassembled and the non-removable storage 117 is forcibly removed from the mobile device 115.

Depending on the implementation, the master key 221 may be sealed by the trusted platform module 220. When the master key 221 is sealed by the trusted platform module 220, it is encrypted and can only be decrypted by the trusted platform module 220. By storing the master key 221 in a sealed form, even if the master key 221 is recovered by a malicious user, it will be unusable in the sealed form.

In some implementations, the master key 221 may be a 128-bit advanced encryption standard ("AES") key. AES is a symmetric-key encryption algorithm in that the same key may be used for both encryption and decryption. Other types of encryption algorithms may be used, such as asymmetric encryption algorithms. In addition, keys that are larger (or smaller) than 128-bits may be used.

The file manager 205 may receive file operations 201. The file operations 201 may include requests to read, write, rename, or create one or more files on the non-removable storage 117 or the removable storage 116. The file operations 201 may be originated by one or more applications executing on the mobile device 115, or by the operating system of the mobile device 115.

When the file manager 205 receives a file operation 201, the file manager 205 may apply one or more filters 215 to the file operation 201 to determine how to proceed. The filters 215 may each include one or more characteristics that are matched against file operations 201 and one or more actions to take with respect to file operations 201 that match the characteristics. For example, one filter of the filters 215 may match file operations 201 that are directed to the removable storage 116, and another of the filters 215 may match file operations 201 that are directed to the non-removable storage 117. Other types of filters 215 may be used.

When a file operation 201 matches the filter associated with the removable storage 116, the actions taken by the file manager 205 may depend on the type of the file operation 201. Where the file operation comprises a request to create or store a new content item 155 such as an application, the file manager 205 may request a security descriptor from the security manager 210. Depending on the implementation, the security descriptor may specify the resources or files of the mobile device 115 that the application may access (e.g., the camera, GPS, user contacts, etc.) as well as the location or region of the removable storage 116 that the application may be stored. The security descriptor may specify if the content item 155 is to be stored in an encrypted form on the removable storage 116, as well as the key that will be used to encrypt the content item 155 (e.g., the master key 221).

For some content items 155, it may not be necessary to store them in encrypted form. For example, the content item 155 may be a photo created by the user of the mobile device 115, or where the content item 155 is an application, a creator of the application may not want or require the application to be stored in an encrypted form. Whether or not the content item 155 is to be encrypted may be determined based on metadata associated with the content item 155, and/or based on a configuration of the mobile device 115.

In some implementations, the security descriptor may include a unique identifier of the content item 155. The security manager 210 may generate the identifier, or the identifier may already be associated with the content item 155 as metadata, for example. Where the content item 155 is an application, the identifier of the application may also be known as a chamber identifier. The security descriptor may be stored by the security manager 210 in the non-removable storage 117 in a system registry, for example.

The file manager 205 may receive the security descriptor, and may determine how to store the content item 155 based on information included in the security descriptor. If the security descriptor indicates that the content item 155 is not to be encrypted, then the file manager 205 may allow the create file operation 201 to write the content item 155 to the removable storage 116. In some implementations, the content item 155 may be written to a folder of the removable storage that is named based on the identifier of the content item 155. In addition, the folder may be hidden, or may be a subfolder of a hidden folder that is used to store some or all of the content items 155 on the removable storage 116.

If the security descriptor indicates that the content item 155 is to be encrypted, the file manager 205 may retrieve the master key 221 indicated by the security descriptor and may use the master key 221 to encrypt the content item 155. The content item 155 may then be stored in the removable storage 116 as described above. Alternatively or additionally, the trusted platform module 220 may encrypt the content item 155 using the master key 221, and/or may allow the signed master key 221 to be used to encrypt the content item 155. The content item 155 may be stored in a region of the removable storage 116 as encrypted content item data 225.

Where the file operation 201 is a request to write to the removable storage 116, the file manager 205 may request the security descriptor for the application that is requesting to write to the removable storage 116. If the application does not have permission or is not authorized, then the file manager 205 may refuse the requested file operation 201.

If the application is authorized, then the file manager 205 may determine if the content item 155 is encrypted. If the content item 155 is not encrypted, then the file manager 205 may allow the write operation to proceed at the location of the removable storage 116 associated with the content item 155. Otherwise, the file manager 205 may retrieve the master key 221 and may facilitate the encryption of the data to be written by the file operation 201 using the received master key. In an implementation, the file manager 205 may encrypt the file using the master key and a logical offset associated with the data to be written as an initialization vector buffer.

In some implementations, the write file operation 201 may be associated with a user buffer. The user buffer may include the data that is to be written to the removable storage 116. Rather than overwrite the data in the user buffer with the encrypted data, the file manager 205 may create a shadow buffer that is used to encrypt the data. For example, the file manager 205 may copy the data from the user buffer into the shadow buffer and may encrypt the data in the shadow buffer. The encrypted data in the shadow buffer may be copied to the location of the removable storage 116 associated with the encrypted content item data 225.

In file systems such as the FAT and exFAT file systems, data is typically written in full sectors such as 512 bytes. Where data to be written is less than a full sector, the file system may write the unwritten bytes of the sector with zeroes. However, because the file manager 205 writes data to the removable storage in encrypted form, the addition of such zeroes to the already encrypted data may make the stored encrypted data unreadable. Therefore, in some implementations, where the data to be written by the file manager 205 is less than a complete sector, the file manager 205 may expand the data to a full sector by adding zeroes before encrypting the data. The encrypted data may be provided to the file system to be written to the sectors of the removable storage 116.

Where the file operation 201 is a request to read from the removable storage 116, the file manager 205 may request the security descriptor for the application that is requesting to read from removable storage 116. If the application does not have permission or is not authorized, then the file manager 205 may refuse the requested file operation 201.

If the application is authorized, then the file manager 205 may determine if the content item 155 is encrypted. If the content item 155 is not encrypted, then the file manager 205 may allow the read operation to proceed at the region or location of the removable storage 116 associated with the content item 155. Otherwise, the file manager 205 may retrieve the master key 221 and may facilitate the decryption of the data to be read by the file operation 201 using the received master key.

Similarly as described above for the write file operation, the read file operation may be associated with a buffer. The buffer may be empty and ready to receive the decrypted data. The file manager 205 may place the decrypted data into the buffer to complete the file operation 201.

In file systems such as FAT and exFAT, typically when performing read operations, when data is requested that past the end of file, or EOF, the file systems return zeroes rather than the requested data that is beyond the EOF because the data beyond the EOF may belong to a different process or user. However, because the data in the sector is encrypted, the data beyond the EOF may be part of the encrypted content item data. Accordingly, to facilitate reading beyond the EOF and to prevent the returning of zeroes, the file manager 205 may configure the kernel or operating system of the mobile device 115 so that the FAT or exFAT file systems do not return zeroes when data that data is requested that exceeds the EOF. Instead, the file systems may be configured to return the actual data and an indicator of the offset where the file system would have begun writing zeroes. The file systems may be configured by setting a bit associated with the kernel, for example.

Figure 3:
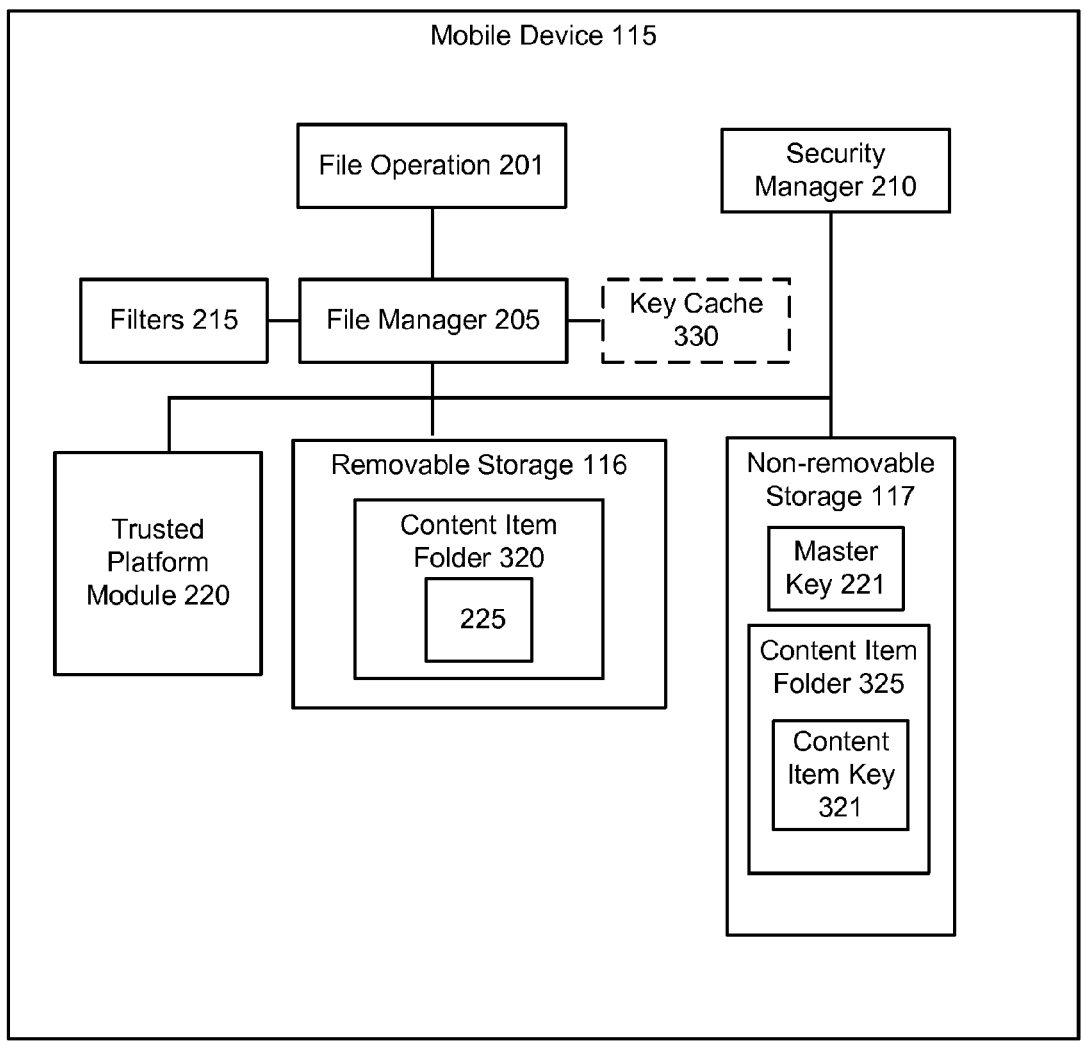
FIG. 3 is another illustration of an implementation of a mobile device.

As noted above, the implementation described in FIG. 2 directed to encrypting based on a single master key may not provide adequate protection to content items 155 with respect to both isolation and piracy. Accordingly, FIG. 3 illustrates an implementation of the mobile device 115 where instead of encrypting each content item 155 using the same master key 221 as described above, each content item 155 may be encrypted using its own associated encryption key. Because each content item 155 is associated with its own key, a content item 155, such as an application, cannot use the master key 221, or its own key, to decrypt and access data associated with a different content item 155 stored on the removable storage 116. As a result, content item isolation is improved and content item piracy may be reduced.

Similarly as described above for FIG. 2, when a file operation 201 that matches the filter 215 associated with the removable storage 116 is received in FIG. 3, the actions taken by the file manager 205 may depend on the type of the file operation 201. Where the file operation 201 is a request to create or store a new content item 155 such as an application, the file manager 205 may request a security descriptor from the security manager 210 as described above. If the security descriptor indicates that the content item 155 is to be encrypted, the file manager 205 may generate a content item key 321 to encrypt the content item 155 before providing the content item 155 to the file system to be stored on the removable storage 116. Alternatively, the security manager 210 may facilitate the generation of the content item key 321 for the content item 155.

Similarly as the master key 221, the content item key 321 may be a symmetric 128-bit AES key. However, unlike the master key 221, the content item key 321 may only be used to encrypt or decrypt the content item 155 that it was generated for or is associated with. In some implementations, the content item key 321 may be generated using the master key 321 and the identifier of the content item 155 such as the chamber identifier.

For example, the content item key 321 may be generated by combining a hash of the identifier of the content item 155 and the master key 221. The hash may be generated using a variety of hash functions including SHA-256. Other hash functions may be used. The content item key 321 may be generated from the combined hash and master key 221 by taking the bottom 128-bits as the content item key 321. Other methods for generating a key, and other sized keys, may be used.

The generated content item key 321 may be used to encrypt the content item 155, and the encrypted content item data 225 may then be provided by the file manager 205 to the file system for storage in the removable storage 116. The encrypted content item data 225 may be stored in a content item folder 320. Each content item 155 may be associated with its own content item folder 320. The content item folder 320 used to store the encrypted content item data 225 associated with a content item 155 may be named based on the identifier of the content item, such as the chamber identifier, for example.

In some implementations, after the content item key 321 is used to encrypt the content item 155, the content item key 321 may be discarded. For any subsequent attempts to read or write to the encrypted content item data 225, the content item key 321 may be regenerated by the file manager 205 based on the master key 221 and the identifier of the content item 155 as described above.

Alternatively, in some implementations, rather than discard the content item key 321 after storing the encrypted content item 225 in the content item folder 320, the file manager 205 may store the generated content item key 321 in the non-removable storage 117. For any subsequent attempts to read or write to the encrypted content item data 225, the stored content item key 321 may be retrieved from the non-removable storage 117.

In some implementations, the content item key 321 may be stored in the non-removable storage 117 in a content item folder 325. The content item folder 325 used to store the content item key 321 may have the same name or identifier as the content item folder 320 used to store the corresponding encrypted content item data 225 in the removable storage 116. In addition, a file structure of the content item folders 325 used to store the content item keys 321 on the non-removable storage 117 may mirror a file structure of the content item folders 320 used to store the encrypted content item data 225 on the removable storage 116.

While storing the content item keys 321 in the non-removable storage 117 may reduce the computational overhead associated with generating the content item keys 321, the presence of the keys 321 on the non-removable storage 117 may allow a malicious user to access the keys 321 by destroying or disassembling the mobile device 115 to get at the non-removable storage 117.

Accordingly, in some implementations, instead of storing content item keys 321 in the non-removable storage 117, the file manager 205 may store one or more of the content items keys 321 in a key cache 330. The key cache 330 may be kept in secure volatile memory of the mobile device 115, so that the contents of the key cache 330 may be erased whenever the mobile device 115 is turned off.

In some implementations, each entry in the key cache 330 may include the content item key 321, and an identifier of the content item 155 that the content item key 321 is associated with. In addition, each entry may include an identifier of the content item folder 320 that the corresponding encrypted content item data 225 is stored in, and/or a copy of the security descriptor associated with the content item 155.

When either a write file operation or a read file operation is received by the file manager 205 for a content item 155, the file manager 205 may determine if there is an entry in the key cache 330 for the content item 155. If there is, the file manager 205 may retrieve the content item key 321 from the key cache 330 and may use the content item key 321 to fulfill the file operation 201 using the encrypted content item data 225.

If there is no entry in the key cache 330 for the content item 155, then the file manager 205 may retrieve the master key 221, and may generate the content item key 321 from the master key 221 and the identifier of the content item 155 as described above. The file manager 205 may use the content item key 321 to fulfill the file operation 201 using the encrypted content item data 225. An entry for the generated content item key 321 may be added to the key cache 330.

In some implementations, the key cache 330 may be a fixed size such as 500 entries. Other sizes may be used. When the key cache 330 is full, an entry for a least recently used content item key 321 may be replaced in the key cache 330. Alternatively, any entry in the content item key cache 330 that is older than a predetermined age may be periodically flushed from the key cache 330.

As noted above, the implementation described in FIG. 3 of encrypting content items 155 using content item specific keys may not provide adequate protection to content items 155 that are applications with respect to both isolation and piracy. For example, applications are often stored across multiple folders where one folder is used to store the binary files related to the application itself, and another folder is used to store the data used by the application during execution such as user setting files and graphics. Accordingly, if only one content item encryption key 321 is used to encrypt both folders, a malicious user may use the content item encryption key 321 to gain access to the binary files associated with a content item 155. The binary files may then be used to reverse engineer the binary files and gain access to the source code, for example.

Figure 4:
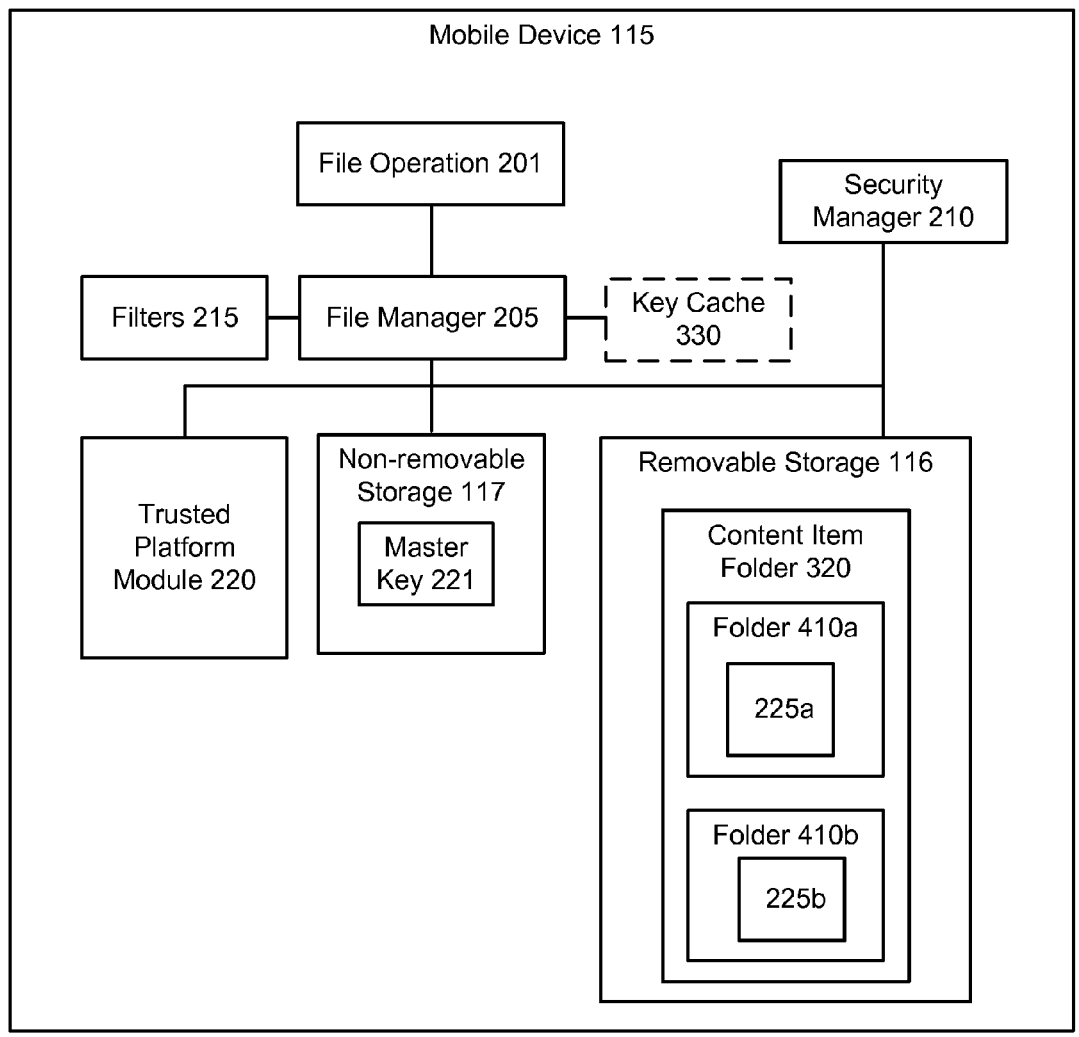
FIG. 4 is another illustration of an implementation of a mobile device.

Accordingly, FIG. 4 illustrates an implementation of the mobile device 115 where instead of encrypting all of a content item using a single content item key 321, each or some of the data folders associated with a content item may be encrypted using its own content item encryption key 321. Because each folder of a content item is associated with its own content item key 321, an application using a content item key 321 to read data from a data folder associated with a content item cannot also use that content item key 321 to access a binary folder associated with the content item. As a result, content item piracy may be further reduced.

Similarly as described above for FIG. 2, in FIG. 4 when a file operation 201 matches the filter 215 associated with the removable storage 116, the actions taken by the file manager 205 may depend on the type of the file operation 201. Where the file operation 201 is a request to create or store a new content item 155 such as an application, the file manager 205 may request a security descriptor from the security manager 210 as described above.

If the security descriptor indicates that the content item 155 is to be encrypted, the file manager 205 may generate a content item folder 320 on the removable storage 116 to store the content item 155. In addition, the file manager 205 may generate multiple folders within the generated content item folder 320. In some implementations, the file manager 205 may generate a folder for each folder of a file structure used by the content item 155. For example, where the content item 155 is an application, the file manager 205 may create a folder 410a that may be used to store binary files related to the application, and a folder 410b that may be used to store data files related to the application. While only two folders are shown (i.e., folders 410a and 410b) it is for illustration only; there is no limit to the number of folders that may be created.

After creating the folders 410a, 410b, the file manager 205 and/or the security manager 210, may generate a content item key 321 for each of the generated folders. Similarly as described above, the generated content item key 321 may be a symmetric 128-bit AES key. In some implementations, the content item key 321 for a folder may be generated using the master key 321, the identifier of the content item 155, and an identifier of the folder. For example, the content item key 321 for the folder 410a may be generated by combining a hash of the identifier of the content item 155 and the identifier of the folder 410a, and the master key 221.

The generated content item keys 321 may be used to encrypt the content item 155. The generated content item key 321 for the folder 410a may be used encrypt a first portion of the content item 155 as encrypted content item data 225a, and the generated content item key 321 for the folder 410b may be used encrypt a second portion of the content item 155 as encrypted content item data 225b. The encrypted content item data 225a and the encrypted content item data 225b may be provided to the file system for storage in the folders 410a and 410b, respectively. In an implementation, where the content item data 155 is an application, the first portion of the content item 155 may comprise binary files of the application and the second portion of the content item 155 may comprise application files of the application.

After storing the encrypted content item data 225a and 225b, both of the content item keys 321 may be discarded. Alternatively, one or both of the content item keys 321 may be added to the key cache 330. Each content item key 321 in the key cache may be indexed using the identifier of the associated content item 155, and the identifier of the associated folder.

When a file operation 201 (such as a read or a write operation) is received by the file manager 205, the file manager 205 may determine the content item 155 and the folder associated with the file operation 201. The file manager 205 may use identifiers of the content item 155 and the folder to either generate the content item key 321 associated with the content item 155 and folder, or to retrieve the content item key 321 from the key cache 330. The content items key 321 may be used by the file manager 205 to facilitate the performance of the file operation 201.

Figure 5:
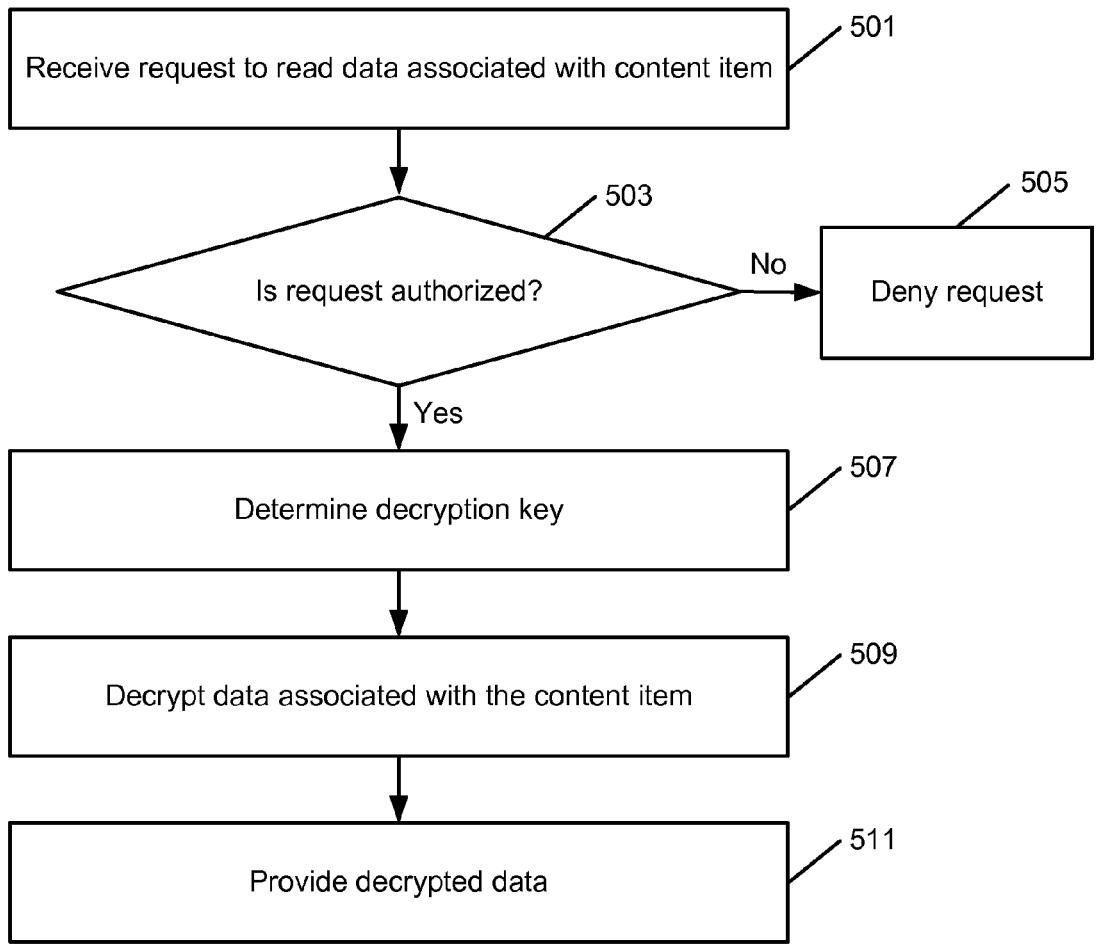
FIG. 5 is an illustration of an implementation of an exemplary method for fulfilling a request to perform a read operation.

FIG. 5 is an illustration of an implementation of an exemplary method 500 for fulfilling a request to perform a read operation. The method 500 may be implemented by the mobile device 115, for example.

A request to read data is received at 501. The request is associated with a content item 155 and may comprise a read file operation 201. The request may be received by the file manager 205 of the mobile device 115 from an application or operating system executing on the mobile device 115. The request may be to read encrypted content item data 225 stored on removable storage 116. The removable storage 116 may comprise an SD card, and may be formatted using a file system such as FAT or exFAT. Other file systems may be supported. Depending on the implementation, the request may match one or more filters 215 associated with the removable storage 116.

A determination as to whether the request is authorized is made at 503. Whether the request is authorized may be determined by the file manager 205 by determining if the requestor of the data is authorized to read the data. In some implementations, the file manager 205 may make the determination using a security descriptor provided by the security manager 210, for example. If the request is not authorized, then the method 500 may continue at 505 where the request is denied by the file manager 205. If the request is authorized, then the method 500 may continue at 507.

A decryption key is determined at 507, by the file manager 205 for example. The decryption key may be a 128-bit AES symmetric key. Other keys may be used. In implementations where a single master key 221 is used to decrypt all content items 155, the master key 221 may be retrieved from the non-removable storage 117, and/or retrieved from the trusted platform module 220 or the security manager 210. The master key 221 may be sealed by the trusted platform module 220, for example.

In some implementations, the master key 221 may be backed up and restored to the cloud storage 190 so that the content stored on the removable storage 116 can be accessed in the event of a hardware failure on its non-removable storage 117. For example, if the mobile device 115 were to experience a hardware failure, the removable storage 116 may be placed in a new replacement mobile device 115, and the master key 221 may be restored from the backup in the cloud storage 190. The backup/restore of the master key 221 with the cloud storage 190 may be tied to a username/password or some other identification unique to the user of the device 115. The master key 221 may be exchanged with the cloud storage 190 using encryption to prevent someone from being able to uncover the master key 221 before it was restored on the replacement mobile device 115.

In implementations where a different content item key 321 is used to decrypt each content item 155, the content item key 321 corresponding to the content item 155 associated with the request to read data may be determined by the file manager 205. Depending on the implementation, the content item key 321 may be determined by retrieving the content item key 321 from a content item folder 325 on the non-removable storage 117, or may be generated using the master key 221 and an identifier of the content item 155 and/or an identifier of a location or folder where the content item 155 is stored on the removable storage 116.

Alternatively, the file manager 205 may check if the content item key 321 is stored in a key cache 330, and if so, may use the content item key 321 from the key cache 330. If not, the file manager 205 may determine the content item key 321 as described above.

Data associated with the content item is decrypted at 509. The encrypted content item data 225 associated with the content item 155 is retrieved from the removable storage 116 by the file system and decrypted using, depending on the implementations, the master key 221 or the content item key 321. The decrypted data is provided at 511. The decrypted data may be provided by the file manager 205 to the application that originated the request. If the encrypted data was padded with zeroes when it was written to the removable storage 116 then the padding zeroes are removed from the content before it is delivered to the requesting application.

Figure 6:
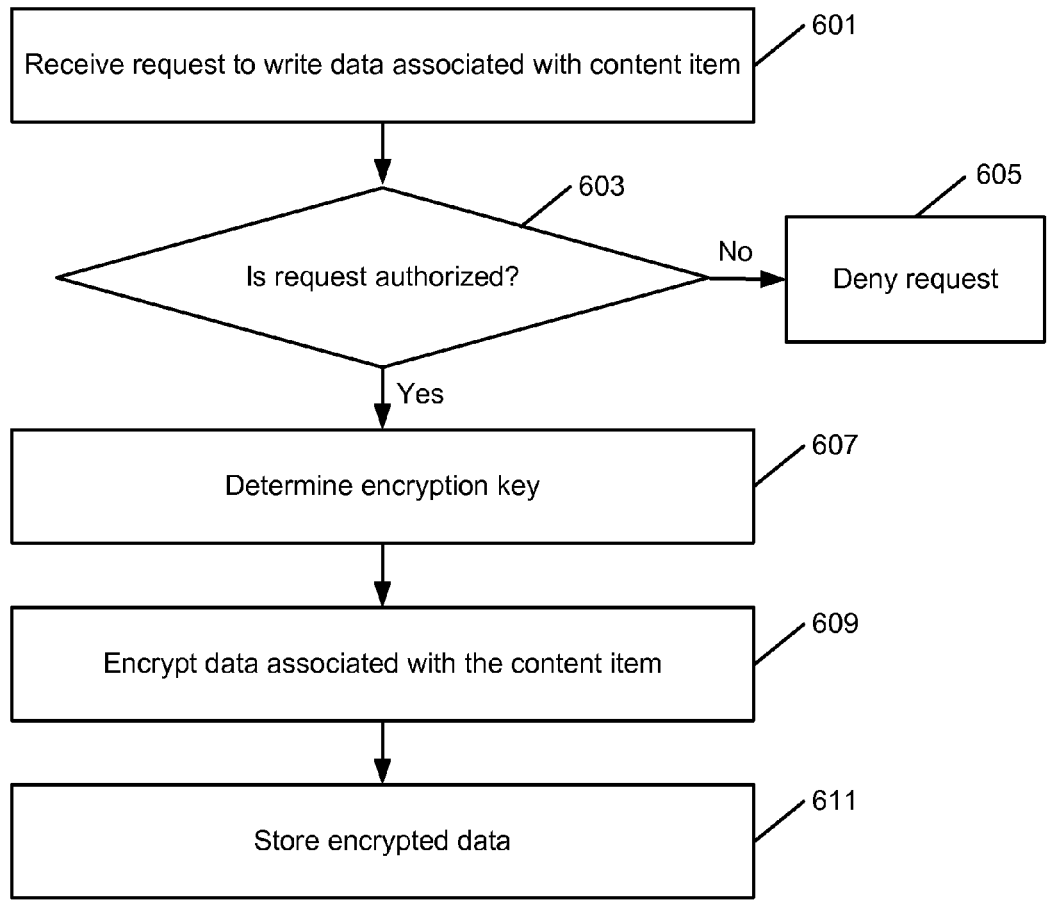
FIG. 6 is an illustration of an implementation of an exemplary method for fulfilling a request to perform a write operation.

FIG. 6 is an illustration of an implementation of an exemplary method 600 for fulfilling a request to perform a write operation. The method 600 may be implemented by the mobile device 115, for example.

A request to write data is received at 601. The request is associated with a content item 155 and may comprise a write file operation 201. The request may be received by the file manager 205 of the mobile device 115 from an application or operating system executing on the mobile device 115. The request may be to write to encrypted content item data 225 stored on removable storage 116.

A determination as to whether the request is authorized is made at 603. Whether the request is authorized may be determined by the file manager 205 by determining if the requestor is authorized to write the data. In some implementations, the file manager 205 may make the determination using a security descriptor provided by the security manager 210, for example. If the request is not authorized then the method 600 may continue at 605 where the request is denied by the file manager 205. If the request is authorized, then the method 600 may continue at 607.

An encryption key is determined at 607. The encryption key is determined by the file manager 205. In implementations where the a single master key 221 is used to encrypt all content items 155, the master key 221 may be retrieved from the non-removable storage 117, and/or retrieved from the trusted platform module 220 or the security manager 210.

In implementations where a different content item key 321 is used to encrypt each content item 155, the content item key corresponding to the content item 155 associated with the request to write data may be determined by the file manager 205. Depending on the implementation, the content item key 321 may be either determined by retrieving the content item key 321 from a content item folder 325 on the non-removable storage 117, or may be generated using the master key 221 and an identifier of the content item 155.

Alternatively, the file manager 205 may check if the content item key 321 is stored in a key cache 330, and if so, use the content item key 321 from the key cache 330. If not, the file manager 205 may determine the content item key 321 as described above.

Data associated with the content item is encrypted at 609. The data may be encrypted by the file manager 205. The request to write data may specify a buffer that includes the data to be written. The file manager 205 may encrypt the data in the buffer using, depending on the implementation, either the master key 221 or the content item key 321. In some implementations, the file manager 205 may copy the data from the specified buffer to a shadow buffer, and may encrypt the data in the shadow buffer. The data may be padded with zeroes before it is encrypted if necessary.

The encrypted data is stored at 611. The encrypted data may be stored by the file system as the encrypted content item data 225 on the removable storage 116. Depending on the implementation, the encrypted content item data 225 may be stored in a content item folder 320. The content item folder 320 may be a hidden folder, for example. Depending on the implementation, the generated content item key 321 may be added to the key cache 330.

Figure 7:
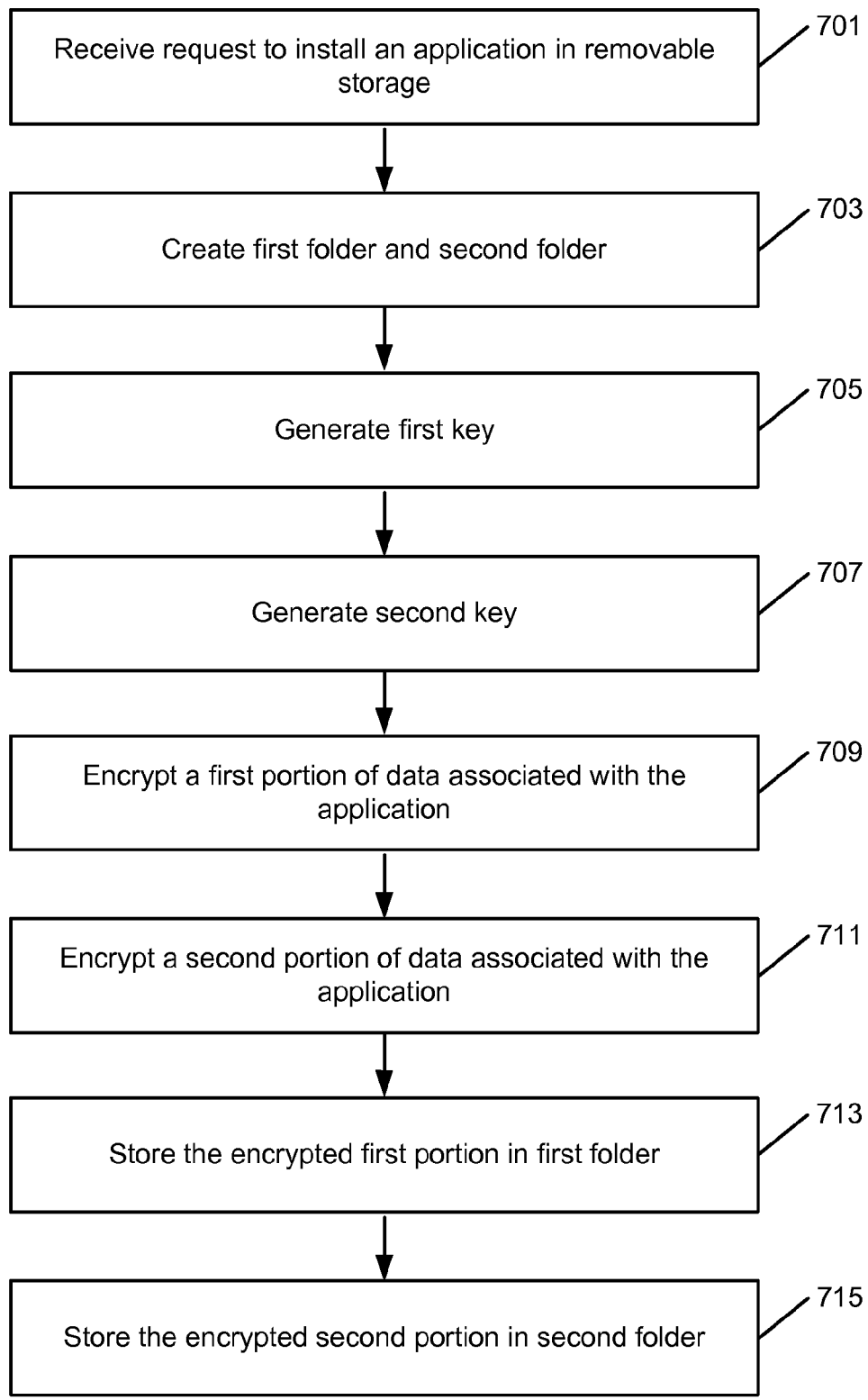
FIG. 7 is an illustration of an implementation of an exemplary method for installing an application on removable storage.

FIG. 7 is an illustration of an implementation of an exemplary method 700 for installing an application on removable storage, such as the removable storage 116. The method 700 may be implemented by the mobile device 115, for example.

A request to install an application in removable storage is received at 701. The request may comprise a file operation 201 and may be received by the file manager 205 of the mobile device 115. The application may be associated with an application identifier. The application identifier may be associated with the application (e.g., as metadata), or may be assigned to the application by the file manager 205.

Because the request is to install an application on the removable storage 116, the request may match a filter 215 associated with the removable storage 116. The application may comprise an example of a content item 155. While the method 700 is described with respect to content items that are applications, it may be applicable to all content items 155 such as image, music, and video content items.

A first folder and a second folder are created at 703. The first folder 410a and the second folder 410b may be created by file manager 205 on the removable storage 116. The file manager 205 may create the folders as instructed by an application installer. More or fewer folders may be created by the file manager 205. In some implementations, the folders may correspond to folders used by the application to organize the data associated with the application. For example, the first folder 410a may be used to hold binary data related to the application such as source code, and may correspond to a binary folder of the application. Similarly, the second folder 401b may be used to hold application data related to the application such as graphics or configuration files and may correspond to a data folder of the application.

The folders 410a and 410b may be created within a content item folder 320 used to store all of the data associated with the application. The content item folder 320 and the folders 410a and 410b may be associated with identifiers.

A first key is generated at 705. The first key may be generated for encrypting the data to store in the first folder 410a. The first key may be generated by the file manager 205 using the master key 221 associated with the trusted platform module 220. In some implementations, the first key may be created by combining the master key 221 with a hash of the identifier of the application and/or the identifier of the first folder 410a. Other methods for generating a key may be used.

A second key is generated at 707. The second key may be generated for encrypting the data to store in the second folder 410b. The second key may be generated by the file manager 205 using the master key 221 associated with the trusted platform module 220. Similarly as the first key, the second key may be created by combining the master key 221 with a hash of the identifier of the application and/or the identifier of the second folder 410b. The first and second keys may be 128-bit AES symmetric encryption keys. Other key sizes and types may be used.

A first portion of data associated with the application is encrypted at 709. The first portion of data may be encrypted by the file manager 205 using the first key. The first portion of data may be encrypted as the encrypted content item data 225a. A second portion of data associated with the application is encrypted at 711. The second portion of data may be encrypted by the file manager 205 using the second key. The second portion of data may be encrypted as the encrypted content item data 225b.

The encrypted first portion of data is stored in the first folder at 713. The encrypted first portion may be stored in the folder 410a by the file manager 205. The encrypted second portion of data is stored in the second folder at 715. The encrypted second portion may be stored in the folder 410b by the file manager 205. Depending on the implementation, the first and second keys may be added to the key cache 330.

Figure 8:
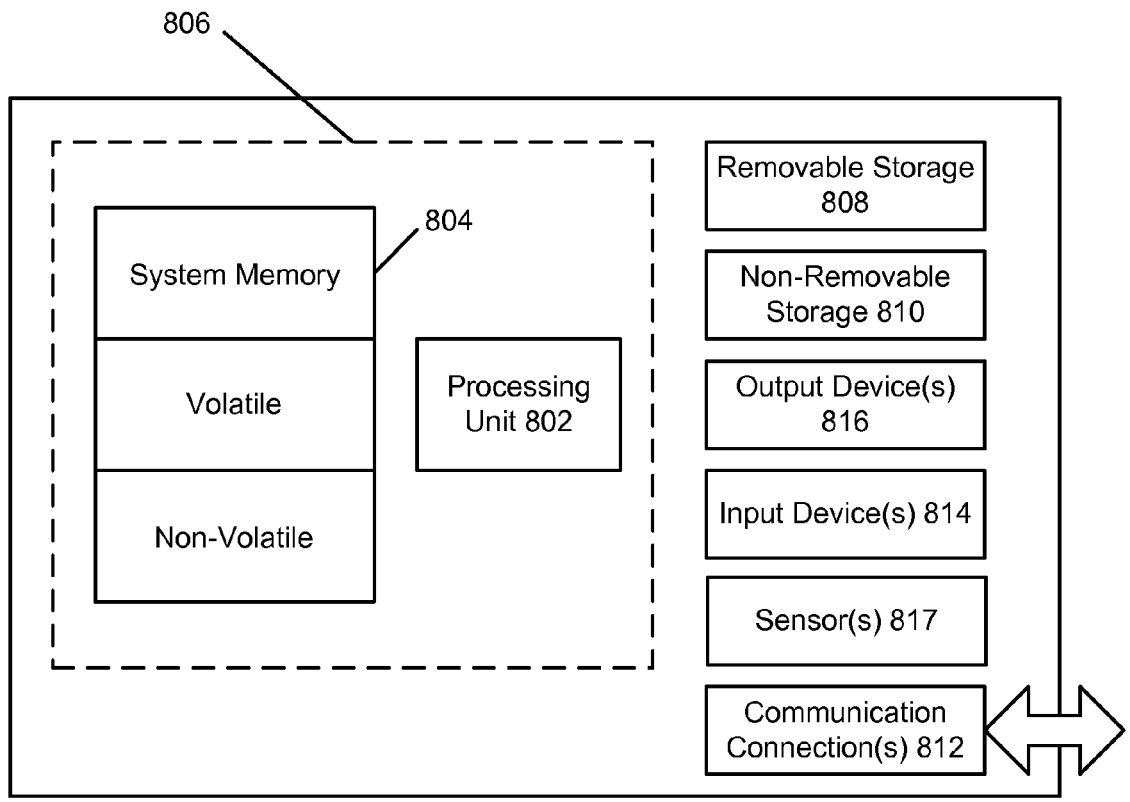
FIG. 8 is an illustration of an exemplary computing environment in which example embodiments and aspects may be implemented.

FIG. 8 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. Computing device 800 depicts the components of a basic computer system providing the execution platform for certain software-based functionality in accordance with various embodiments. Computing device 800 can be an environment upon which a client side library, cluster wide service, and/or distributed execution engine (or their components) from various embodiments is instantiated. Computing device 800 can include, for example, a desktop computer system, laptop computer system or server computer system. Similarly, computing device 800 can be implemented as a handheld device (e.g., cellphone, smart phone, tablet etc.). Computing device 800 typically includes at least some form of computer readable media. Computer readable media can be a number of different types of available media that can be accessed by computing device 800 and can include, but is not limited to, computer storage media.

In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, hard disks, and SD cards. Such additional storage is illustrated in FIG. 8 by removable storage 808 and non-removable storage 810.

Computing device 800 typically includes a variety of computer readable media. Computer readable media can be any available media that can be accessed by device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communication connection(s) 812 that allow the device to communicate with other devices and/or networks. The connections 812 may include Wi-Fi, cellular, Bluetooth, CDMA, GSM, etc. Computing device 800 may also have input device(s) 814 such as a keyboard, capacitive display, pen, voice input device, touch input device, etc. Output device(s) 816 such as a capacitive display, speakers, etc. may also be included. Computing device 800 may also receive data from one or more sensors 817. The sensor(s) 817 such accelerometers, global positioning systems, proximity sensors, gyroscopes, etc. All these devices and sensors are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
receiving, from an operating system, a request to read encrypted data associated with a content item by a file manager executed by a mobile device, the encrypted data stored in removable storage of the mobile device;
determining whether the request to read the encrypted data is authorized by the mobile device;
based at least on a determination that the request to read the encrypted data is authorized, determining a key associated with the content item by the mobile device, the key stored in a region of non-removable storage of the mobile device, wherein determining the key associated with the content item comprises determining the region of the non-removable storage associated with the mobile device, and retrieving the key from the region of the non-removable storage associated with the mobile device;
decrypting the encrypted data associated with the content item using the key by the mobile device to generate decrypted data; and
providing the decrypted data to the operating system by the file manager executed by the mobile device.

2. The method of claim 1, wherein the removable storage comprises a secure digital card.

3. The method of claim 1, wherein the encrypted data is stored on the removable storage in at least one of the file allocation table system or extended file allocation table file system.

4. The method of claim 1, wherein the content item comprises one or more of an application, a video content item, or an audio content item.

5. The method of claim 1, wherein determining a key associated with the content item comprises determining a master key associated with the mobile device and determining the key associated with the content item based on the master key and an identifier associated with the content item.

6. The method of claim 5, wherein the master key is signed by a trusted platform module associated with the mobile device.

7. The method of claim 1, wherein determining a key associated with the content item comprises retrieving the key from a cache associated with the content item using an identifier associated with the content item.

8. A method comprising:
receiving, from an operating system, a request to read encrypted data associated with a content item by a file manager executed by a mobile device, the encrypted data stored in removable storage of the mobile device;
determining a key associated with the content item by the mobile device, the key stored in a region of non-removable storage of the mobile device, wherein determining the key associated with the content item comprises determining the region of the non-removable storage associated with the mobile device, and retrieving the key from the region of the non-removable storage associated with the mobile device;
decrypting the encrypted data associated with the content item using the key by the mobile device to generate decrypted data; and
providing the decrypted data to the operating system by the file manager executed by the mobile device.

9. The method of claim 8, wherein the removable storage comprises a secure digital card.

10. The method of claim 8, wherein the encrypted data is stored on the removable storage in at least one of the file allocation table system or extended file allocation table file system.

11. The method of claim 8, wherein the content item comprises one or more of an application, a video content item, or an audio content item.

12. The method of claim 8, wherein determining a key associated with the content item comprises determining a master key associated with the mobile device and determining the key associated with the content item based on the master key and an identifier associated with the content item.

13. The method of claim 12, wherein the master key is signed by a trusted platform module associated with the mobile device.

14. The method of claim 8, wherein determining a key associated with the content item comprises retrieving the key from a cache associated with the content item using an identifier associated with the content item.

15. A system comprising:
removable storage;
non-removable storage; and
a file manager configured to:
receive a request to read encrypted data associated with a content item, the data stored in the removable storage;
determine whether the request to read the encrypted data is authorized;
based at least on a determination that the request to read the encrypted data is authorized, determine a key associated with the content item, the key stored in the non-removable storage, wherein determining the key associated with the content item comprises determining the region of the non-removable storage, and retrieving the key from the region of the non-removable storage;
decrypt the encrypted data associated with the content item using the key to generate decrypted data; and
provide the decrypted data.

16. The system of claim 15, wherein the removable storage comprises a secure digital card.

17. The system of claim 15, wherein the content item is one or more of an application, a video content item, or an audio content item.

18. The system of claim 15, wherein the system comprises at least one of a cell phone or a tablet computer.

* * * * *